United States Patent
Lei et al.

(10) Patent No.: US 12,288,318 B2
(45) Date of Patent: Apr. 29, 2025

(54) ULTRA-MICRO DEFECT DETECTION APPARATUS AND DETECTION METHOD THEREOF

(71) Applicants: Casi Vision Technology (Luoyang) Co., Ltd., Henan (CN); Casi Vision Technology (Beijing) Co., Ltd., Beijing (CN)

(72) Inventors: Feng Lei, Henan (CN); Wujie Zhang, Henan (CN); Xiaoyun Lv, Henan (CN); Qian Zhang, Henan (CN)

(73) Assignees: Casi Vision Technology (Beijing) Co., Ltd., Beijing (CN); Casi Vision Technology (Luoyang) Co., Ltd., Luoyang (CN)

( * ) Notice: Subject to any disclaimer, the term of this patent is extended or adjusted under 35 U.S.C. 154(b) by 0 days.

(21) Appl. No.: 18/276,771

(22) PCT Filed: Jul. 20, 2022

(86) PCT No.: PCT/CN2022/106633
§ 371 (c)(1),
(2) Date: Aug. 10, 2023

(87) PCT Pub. No.: WO2023/011174
PCT Pub. Date: Feb. 9, 2023

(65) Prior Publication Data
US 2024/0119577 A1    Apr. 11, 2024

(30) Foreign Application Priority Data
Aug. 2, 2021    (CN) .................. 202110878028.5

(51) Int. Cl.
*G06T 7/00*    (2017.01)
*G01N 21/88*    (2006.01)
(Continued)

(52) U.S. Cl.
CPC ....... *G06T 7/0002* (2013.01); *G01N 21/8851* (2013.01); *G02B 21/18* (2013.01);
(Continued)

(58) Field of Classification Search
None
See application file for complete search history.

(56) References Cited

U.S. PATENT DOCUMENTS 4,806,774 A    2/1989    Lin et al.
5,264,912 A    11/1993    Vaught et al.
(Continued)

FOREIGN PATENT DOCUMENTS

CN    108291802 A    7/2018
CN    111896557 A    11/2020
(Continued)

OTHER PUBLICATIONS

First Office Action dated Sep. 8, 2021 in connection with Chines Application No. 202110878028.5 and English translation thereof.
Notification to Grant Patent Right dated Oct. 8, 2021 in connection with Chinese Application No. 202110878028.5 and English translation thereof.
(Continued)

*Primary Examiner* — Edemio Navas, Jr.
(74) *Attorney, Agent, or Firm* — Wolf, Greenfield & Sacks, P.C.

(57) ABSTRACT

The present application discloses an ultra-micro defect detection apparatus and a detection method thereof. The apparatus includes an imaging module, a light source module, a filtering module, and a mounting platform; the imaging module further includes a camera, an imaging lens, and an objective lens; the camera, the imaging lens, and the objective lens are sequentially and vertically arranged from top to bottom; the light source module further includes a collimator, a light source generator, and a beam splitting
(Continued)

mirror; the light source generator is connected to the beam splitting mirror, and the collimator is mounted between the light source generator and the beam splitting mirror; the filtering module further includes a spatial filter, and the spatial filter is mounted between the imaging lens and the objective lens.

15 Claims, 5 Drawing Sheets

(51) Int. Cl.
  *G02B 21/18* (2006.01)
  *G02B 21/36* (2006.01)
  *G06T 7/521* (2017.01)

(52) U.S. Cl.
  CPC ............ *G02B 21/365* (2013.01); *G06T 7/521* (2017.01); *G01N 2201/0633* (2013.01); *G01N 2201/0636* (2013.01)

(56) References Cited

U.S. PATENT DOCUMENTS

| | | | |
|---|---|---|---|
| 6,031,607 A * | 2/2000 | Miyazaki | G06T 7/001 359/559 |
| 2015/0003722 A1 | 1/2015 | Otani et al. | |
| 2018/0088305 A1* | 3/2018 | Itoh | G02B 26/0808 |
| 2023/0037764 A1* | 2/2023 | Haag | H04N 23/55 |

FOREIGN PATENT DOCUMENTS

| | | |
|---|---|---|
| CN | 112518423 A | 3/2021 |
| CN | 113325006 A | 8/2021 |
| JP | H06-67120 A | 3/1994 |
| JP | H10-293103 A | 11/1998 |
| JP | 2000-180373 A | 6/2000 |

OTHER PUBLICATIONS

International Search Report and Written Opinion mailed Sep. 28, 2022 in connection with International Application No. PCT/CN2022/106633.

\* cited by examiner

ULTRA-MICRO DEFECT DETECTION APPARATUS AND DETECTION METHOD THEREOF

CROSS-REFERENCE TO RELATED APPLICATIONS

This application is a national stage under 35 U.S.C. § 371 of International Application PCT/CN2022/10663, filed Jul. 20, 2022, and entitled "Ultra-Micro Defect Detection Apparatus and Detection Method Thereof." International Application PCT/CN2022/10663 claims the benefit of Chinese Patent Application No. 202110878028.5, filed with the Chinese National Intellectual Property Administration on Aug. 2, 2021, and entitled "Ultra-Micro Defect Detection Apparatus and Detection Method Thereof." The contents of these applications are herein incorporated by reference in their entirety.

TECHNICAL FIELD

The present disclosure belongs to the technical field of machine vision detection, in particular to an ultra-micro defect detection apparatus and a detection method thereof.

BACKGROUND ART

Ultra-micro defects refer to minute defects existing on a high-precision smooth surface, and they are sized about 0.5 microns. These defects include surface scratches, spots, indentations, inclusions, breakages, stains and other types of defects. These defects not only affect appearance of a product, but also affect performance of the product itself. For example, a defect existing on a surface of a wafer for fabricating chips causes instable performance of a chip etched at this position, and even causes a discarded chip, thus reducing yield and increasing manufacturing costs of semiconductor chip. Therefore, it is of quite important significance to detect minute defects on a surface.

At present, technologies for detecting a surface defect include AFM (Atomic Force Microscope), SEM (Scanning Electron Microscope), OM (Optical Microscope) and so on. In the above, the AFM has real-time, in-situ and nanoscale analysis accuracy, and the SEM has advantages of high resolution, a large depth of field, a wide magnification range and so on. As common defect detection means, the OM has advantages such as non-contact, non-damage, and easy operation, and is suitable for detecting a defect of surfaces of different to-be-detected objects. For example, a defect of surfaces of different objects such as liquid to-be-detected object, magnetic to-be-detected object, non-conductive to-be-detected object can be detected by the OM. In the three microscopes above, the smallest defect size that can be detected by the AFM is the smallest, and an imaging field of view is also the smallest; and the SEM is between the optical microscope and the atomic force microscope. The imaging field of view of the OM is the largest, which facilitates detecting a defect in a larger range, but since the smallest detectable defect size is about 0.5 microns, the imaging field of view of the optical microscope is merely around 0.35 mm×0.25 mm.

The applicant noted that current detection devices have a characteristic that the smaller the smallest detectable defect size is, the smaller the imaging field of view is, causing longer time for detecting the whole to-be-detected object, and lower detection efficiency.

For a general optical imaging system, it has magnification of 0.5 folds, and a detection range of 14 mm×10 mm, and only can detect defects of 15 microns or more. However, for ultra-micro defects, accuracy of 15 microns or more is far from enough, and therefore, the microscopic imaging technology needs to be used. A surface defect of 0.5 microns can be detected by 20-fold microscopic imaging technology, but the imaging field of view will be sharply decreased to about 0.35 mm×0.25 mm.

Hence, there is currently an urgent need in the industry for a detection method having a larger imaging field of view and being capable of detecting smaller defects.

SUMMARY

In view of this, technical problems to be solved by the present disclosure at least include: providing an optical filtering imaging technology, which can detect a defect of 0.5 microns in a detection range of 14 mm×10 mm.

In order to solve the above technical problems, according to a first aspect of the present disclosure, provided is an ultra-micro defect detection apparatus, including an imaging module, a light source module, a filtering module, a mounting platform, wherein
- the imaging module includes: a camera 7, an imaging lens 8, and an objective lens 9, and the camera 7, the imaging lens 8, and the objective lens 9 are sequentially and vertically arranged from top to bottom;
- the light source module includes: a collimator 10, a light source generator 11, and a beam splitting mirror 12, the light source generator 11 is connected to the beam splitting mirror 12, and the collimator 10 is mounted between the light source generator 11 and the beam splitting mirror 12, and
- the filtering module includes a spatial filter 6, and the spatial filter 6 is mounted between the imaging lens 8 and the objective lens 9, for magnifying a defect of a surface of a to-be-detected object 4.

In an exemplary solution, the apparatus further includes an image analyzing and processing module 1; and the image analyzing and processing module 1 is connected to the camera 7, for performing image analysis and processing on an acquired image.

In an exemplary solution, the objective lens 9 includes a Fourier transform lens 5; and the imaging lens 8 includes: an inverse Fourier transform lens 2.

In an exemplary solution, the beam splitting mirror 12, the objective lens 9, the imaging lens 8, and the camera 7 are all connected to a displacement seat, and are fixed on a surface of the mounting platform by the displacement seat, ranging rods are mounted on one side of the displacement seat, and the beam splitting mirror 12, the objective lens 9, the imaging lens 8, and the camera 7 are movably adjusted on the displacement seat, and are mounted at intervals by measuring distances by the respective ranging rods on the displacement seat.

In an exemplary solution, the spatial filter 6 is mounted between the objective lens 9 and the imaging lens 8, the spatial filter 6 is connected to the displacement seat and is fixed on the surface of the mounting platform by the displacement seat, a ranging rod is mounted on one side of the displacement seat facing the objective lens 9, the spatial filter 6 is movably adjusted on the displacement seat, and the spatial filter 6 is mounted at intervals with the Fourier transform lens 5 and the inverse Fourier transform lens 2.

In an exemplary solution, the spatial filter 6 includes: an optical high-pass filter.

In an exemplary solution, the spatial filter 6 includes: an optical high-pass filter, wherein by controlling a position and a band-pass range of the optical high-pass filter, the image analyzing and processing module obtains a high-contrast image of high-frequency light information caused by a defect of a smooth surface of the to-be-detected object 4 relative to zero-frequency light information.

In an exemplary solution, the light source generator 11 is installed at a focal point of the collimator 10 away from the beam splitting mirror 12, the light source generator 11 emits a diffused light beam, and the diffused light beam is changed into a parallel light beam through the collimator 10 and enters the beam splitting mirror 12.

In an exemplary solution, the camera 7 acquires multiple images at different imaging positions, and the image analyzing and processing module 1 performs superimposition processing on the multiple images to obtain a surface shape image of the to-be-detected object 4.

In an exemplary solution, light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

According to a second aspect of the present disclosure, provided is an ultra-micro defect detection method, including the following steps:

step 1, emitting detection light rays, to irradiate a surface of a to-be-detected object;

step 2, reflecting the detection light rays by the surface of the to-be-detected object to obtain reflected light rays, and performing optical Fourier transformation on the reflected light rays;

step 3, performing filtering modulation processing on the light rays having undergone the optical Fourier transformation, wherein the filtering modulation processing includes magnifying a defect of the surface of the to-be-detected object by a spatial filter;

step 4, performing inverse Fourier transformation on the light rays having undergone the filtering modulation processing, and obtaining a surface shape image of the to-be-detected object 4 by imaging; and step 5, analyzing and processing the acquired surface shape image of the to-be-detected object 4.

In an exemplary solution, the step 1 further includes: emitting, by the light source generator 11, a diffused light beam right to a focal point direction of the collimator 10, changing the diffused light beam into a parallel light beam through the collimator 10 to enter the beam splitting mirror 12, and irradiate the surface of the to-be-detected object 4 on the detection platform 3;

the steps 2 and 3 further include: making the parallel light beam to be reflected on the surface of the to-be-detected object 4, reflecting the reflected light beam to the objective lens 9, transmitting the reflected light beam to the spatial filter 6 by the Fourier transform lens 5 in the objective lens 9, and forming a Fourier transform spatial frequency spectrum of the reflected light beam on the surface of the to-be-detected object 4 at the spatial filter 6, and performing the filtering modulation processing on the Fourier transform spatial frequency spectrum by the spatial filter 6;

the step 4 further includes: after the Fourier transform spatial frequency spectrum passing through the spatial filter 6, making the Fourier transform spatial frequency spectrum to be incident to an imaging lens 8, and imaged to a surface of a photoelectric sensor of a camera 7 by an inverse Fourier transform lens 2 at the imaging lens 8, to form the surface shape image of the to-be-detected object 4; and the step 5 further includes: performing analysis and processing on the acquired surface shape image of the to-be-detected object 4 by the image analyzing and processing module 1.

In an exemplary solution, by controlling a position and a band-pass range of the spatial filter, a high-contrast image of high-frequency light information caused by a defect of a smooth surface of the to-be-detected object 4 relative to zero-frequency light information is obtained.

In an exemplary solution, the step 4 further includes:

by changing an imaging position, acquiring multiple images at different imaging positions, and forming the surface shape image of the to-be-detected object 4 based on an image superposition processing algorithm.

Beneficial effects of the present disclosure at least include:

the present disclosure can realize detection of an ultra-micro defect of a high-precision smooth surface, realize detection of a defect of 0.5 microns in a range of 14 mm×10 mm, and realize high-speed detection of defects such as polishing marks, depressions, bumps, voids, and foreign objects of an ultra-smooth surface, with short detection time and high detection efficiency; the present disclosure adopts a non-contact defect detection manner, does not damage the surface of the to-be-detected object, and is suitable for detecting a detect of a surface easy to damage; and compared with the commonly used optical microscopic imaging system, this method has high resolution and a large field of view, and can identify submicron-sized defects distributed in a range of tens of millimeters.

BRIEF DESCRIPTION OF DRAWINGS

In order to more clearly illustrate technical solutions in embodiments of the present disclosure or the prior art, drawings which need to be used in the description of the embodiments or the prior art will be introduced briefly below, and apparently, the drawings in the following description merely show some embodiments or the prior art, and those ordinarily skilled in the art still could obtain other similar or relevant drawings in light of these drawings, without using any creative efforts.

Figure 1:
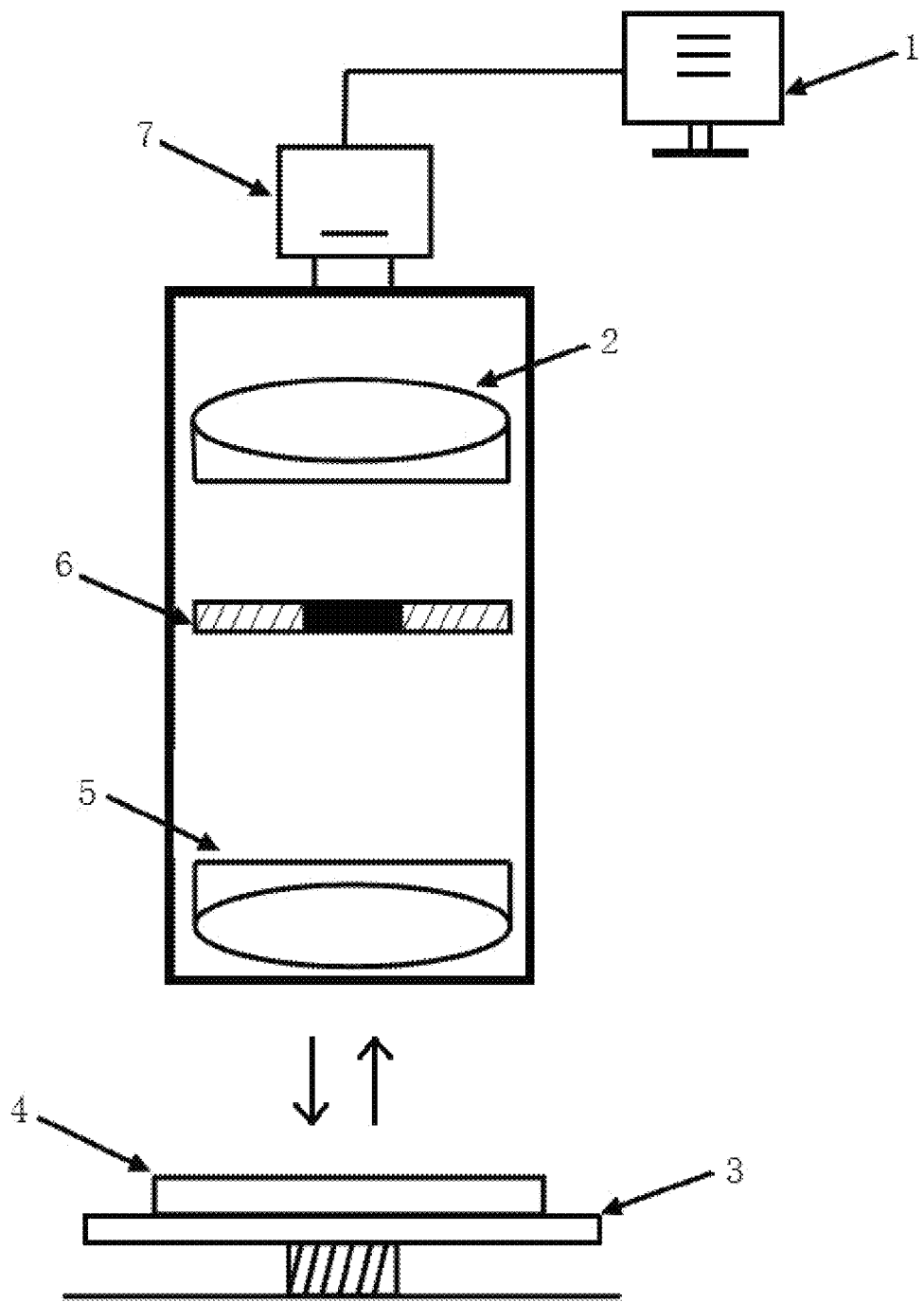
FIG. 1 is a first schematic diagram of a detection apparatus according to an embodiment of the present disclosure.

In the drawings: 1—image analyzing and processing module, 2—inverse Fourier transform lens, 3—detection platform, 4—to-be-detected object, 5—Fourier transform lens, 6—spatial filter, 7—camera, 8—imaging lens, 9—objective lens, 10—collimator, 11—light source generator, 12—beam splitting mirror, 13—incident light and reflected light in one direction, 14—incident light and reflected light in another direction.

DETAILED DESCRIPTION OF EMBODIMENTS

The present disclosure is described in detail below with reference to embodiments. In order to make the objectives, technical solutions, and advantages of the present disclosure clearer and more explicit, the present disclosure is further described in detail, but the present disclosure is not limited to these embodiments. The present disclosure is further described in detail with reference to the drawings. These drawings are all simplified schematic diagrams, and merely schematically illustrate the basic structure of the present disclosure, therefore, they only show configuration related to the present disclosure.

For the existing detection apparatus, the imaging field of view and the smallest detectable defect size restrict each other, in other words, the smaller the smallest detectable defect size is, the smaller the imaging field of view is, and it is very hard to satisfy both conditions at the same time. To detect ultra-micro detect size, a small imaging field of view will cause longer time for detecting the whole to-be-detected object, and lower detection efficiency.

For a general optical imaging system, it has magnification of 0.5 folds, and a detection range of 14 mm×10 mm, and only can detect defects of 15 microns or more. However, for ultra-micro defects, accuracy of 15 microns or more is far from enough, therefore, the microscopic imaging technology needs to be used. A surface defect of 0.5 microns can be detected by 20-fold microscopic imaging technology, but the imaging field of view will be sharply decreased to about 0.35 mm×0.25 mm.

The detection apparatus of the present disclosure can be suitable for detecting ultra-micro defects, and is particularly suitable for a smooth surface with relatively few ultra-micro defects.

Figure 2:
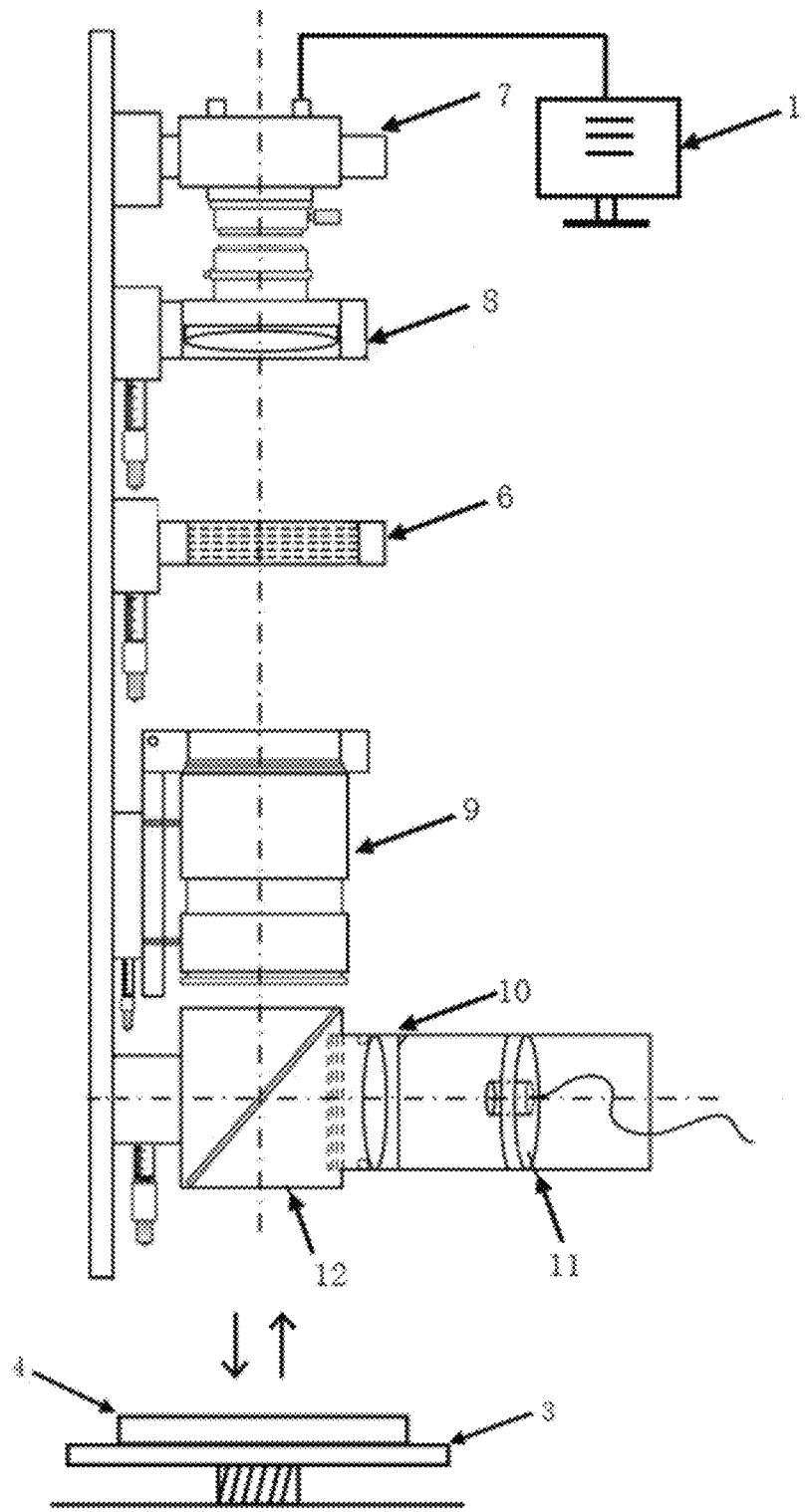
FIG. 2 is a second schematic diagram of the detection apparatus according to an embodiment of the present disclosure.

FIG. 1 is a first schematic diagram of the detection apparatus according to an embodiment of the present disclosure. FIG. 2 is a second schematic diagram of the detection apparatus according to an embodiment of the present disclosure.

In an embodiment of the present disclosure, an ultra-micro defect detection apparatus is provided, including an imaging module, a light source module, a filtering module, and a mounting platform.

The imaging module includes: a camera 7, an imaging lens 8, and an objective lens 9, and the camera 7, the imaging lens 8, and the objective lens 9 are sequentially and vertically arranged from top to bottom.

The light source module includes: a collimator 10, a light source generator 11, and a beam splitting mirror 12, the light source generator 11 is connected to the beam splitting mirror 12, and the collimator 10 is mounted between the light source generator 11 and the beam splitting mirror 12.

The filtering module includes a spatial filter 6, and the spatial filter 6 is mounted between the imaging lens 8 and the objective lens 9, for magnifying a defect of a surface of a to-be-detected object 4.

In a possible implementation mode, the apparatus further includes an image analyzing and processing module 1; and the image analyzing and processing module 1 is connected to the camera 7, for performing image analysis and processing on an acquired image.

In a possible implementation mode, the objective lens 9 includes a Fourier transform lens 5; and the imaging lens 8 includes an inverse Fourier transform lens 2.

In a possible implementation mode, the beam splitting mirror 12, the objective lens 9, the imaging lens 8, and the camera 7 are all connected to a displacement seat, and are fixed on a surface of the mounting platform by the displacement seat, ranging rods are mounted on one side of the displacement seat, and the beam splitting mirror 12, the objective lens 9, the imaging lens 8, and the camera 7 are movably adjusted on the displacement seat, and are mounted at intervals by measuring distances by the respective ranging rods on the displacement seat.

In a possible implementation mode, the spatial filter 6 is mounted between the objective lens 9 and the imaging lens 8, the spatial filter 6 is connected to the displacement seat and is fixed on the surface of the mounting platform by the displacement seat, a ranging rod is mounted on one side of the displacement seat facing the objective lens 9, the spatial filter 6 is movably adjusted on the displacement seat, and the spatial filter 6 is mounted at intervals with the Fourier transform lens 5 and the inverse Fourier transform lens 2.

In a possible implementation mode, the spatial filter 6 includes: an optical high-pass filter.

In a possible implementation mode, the spatial filter 6 includes: an optical high-pass filter, wherein by controlling a position and a band-pass range of the optical high-pass filter, the image analyzing and processing module obtains a high-contrast image of high-frequency light information caused by a defect of a smooth surface of the to-be-detected object 4 relative to zero-frequency light information.

In a possible implementation mode, the light source generator 11 is installed at a focal point of the collimator 10 away from the beam splitting mirror 12, the light source generator 11 emits a diffused light beam, and the diffused light beam is changed into a parallel light beam through the collimator 10 and enters the beam splitting mirror 12.

In a possible implementation mode, the camera 7 acquires multiple images at different imaging positions, and the image analyzing and processing module 1 performs superimposition processing on the multiple images to obtain a surface shape image of the to-be-detected object 4.

In a possible implementation mode, light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

After the spatial filter magnifies the high-frequency light beam, an imaging position of the defect and an imaging position of optical Fourier transform system are located at different positions, and by changing an optical imaging position, and acquiring multiple images at different imaging positions, an output image is formed using an image super-position processing algorithm.

In the above, the beam splitting mirror of the present disclosure functions to split the incident light beam into two beams, or to combine two beams into one beam of light. In this solution, the beam splitting mirror mainly turns illumination light beam by 90 degrees and guides the same into an optical system. The conventional spectroscope generally splits a beam of light in space according to wavelength, and exhibits spectral distribution. In order to avoid misunderstanding, the beam splitting mirror is used herein.

Optionally, the light source generator can use a plurality of point light sources, optical fiber output ends and so on, and by setting distribution of the point light sources or the optical fiber output ends, parallel light of different inclined directions is formed and irradiates the surface of the to-be-detected object.

Optionally, the image analyzing and processing module 1 includes a computer, or a chip unit having an image processing capability.

Figure 3:
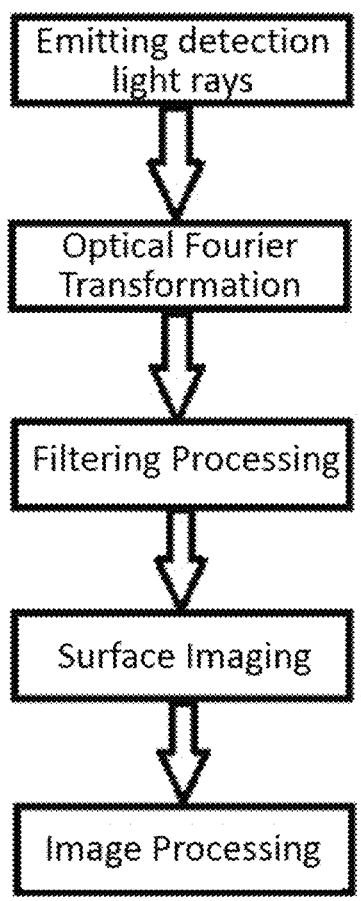
FIG. 3 is a flowchart of a detection method according to an embodiment of the present disclosure.

FIG. 3 is a flowchart of a detection method according to an embodiment of the present disclosure. In an embodiment of the present disclosure, an ultra-micro defect detection method is provided, performing detection by the above ultra-micro defect detection apparatus, including the following steps:
- step 1, emitting detection light rays, to irradiate a surface of a to-be-detected object;
- step 2, reflecting the detection light rays by the surface of the to-be-detected object to obtain reflected light rays, and performing optical Fourier transformation on the reflected light rays;
- step 3, performing filtering modulation processing on the light rays having undergone the optical Fourier transformation, wherein the filtering modulation processing includes magnifying a defect of the surface of the to-be-detected object by a spatial filter;
- step 4, performing inverse Fourier transformation on the light rays having undergone the filtering modulation processing, and obtaining a surface shape image of the to-be-detected object 4 by imaging; and
- step 5, analyzing and processing the acquired surface shape image of the to-be-detected object 4.

In an exemplary solution, step 1 further includes: emitting, by the light source generator 11, a diffused light beam right to a focal point direction of the collimator 10, changing the diffused light beam into a parallel light beam through the collimator 10 to enter the beam splitting mirror 12, and irradiate the surface of the to-be-detected object 4 on the detection platform 3;
- steps 2 and 3 further include: making the parallel light beam to be reflected on the surface of the to-be-detected object 4, reflecting the reflected light beam to the objective lens 9, transmitting the reflected light beam to the spatial filter 6 by the Fourier transform lens 5 in the objective lens 9, and forming a Fourier transform spatial frequency spectrum of the reflected light beam on the surface of the to-be-detected object 4 at the spatial filter 6, and performing the filtering modulation processing on the Fourier transform spatial frequency spectrum by the spatial filter 6;
- step 4 further includes: after the Fourier transform spatial frequency spectrum passing through the spatial filter 6, making the Fourier transform spatial frequency spectrum to be incident to an imaging lens 8, and imaged to a surface of a photoelectric sensor of a camera 7 by an inverse Fourier transform lens 2 at the imaging lens 8, to form the surface shape image of the to-be-detected object 4; and
- step 5 further includes: performing analysis and processing on the acquired surface shape image of the to-be-detected object 4 by the image analyzing and processing module 1.

In an exemplary solution, by controlling a position and a band-pass range of the spatial filter, a high-contrast image of high-frequency light information caused by a defect of a smooth surface of the to-be-detected object 4 relative to zero-frequency light information is obtained.

In an exemplary solution, step 4 further includes:
- by changing an imaging position, acquiring multiple images at different imaging positions, and forming the surface shape image of the to-be-detected object 4 based on an image superposition processing algorithm.

Embodiment 1 is suitable to surface depression defects such as dents, scratches, and indentations.

As shown in FIG. 1 and FIG. 2, an ultra-micro defect detection apparatus for a high-precision smooth surface of the present disclosure includes a light source generator 11, the light source generator 11 is connected to a beam splitting mirror 12, a collimator 10 is provided between the light source generator 11 and the beam splitting mirror 12, a light source generation point of the light source generator 11 is placed right facing a focal point of the collimator 10, the light source generator 11 emits a diffused light beam, the diffused beam is changed into a parallel light beam through the collimator 10 and enters the beam splitting mirror 12. A detection platform 3 is provided beside the beam splitting mirror 12, a to-be-detected object 4 is provided on a surface of the detection platform 3, the parallel light beam irradiates the surface of the to-be-detected object 4 through the beam splitting mirror 12, and is reflected on the surface of the to-be-detected object 4, an objective lens 9, an optical high-pass filter, an imaging lens 8, and a camera 7 are successively arranged at intervals along a reflection direction of the light beam on the surface of the to-be-detected object 4, and the camera 7 is connected to an image analyzing and processing module 1. In the above, the objective lens 9 is mounted therein with a Fourier transform lens 5, and the imaging lens 8 is composed of an inverse Fourier transform lens 2.

An ultra-micro defect detection method for a high-precision smooth surface as shown in FIG. 3 includes: a step of emitting detection light rays; a step of optical Fourier transformation; a step of filter processing; a step of surface imaging; and a step of image processing, which are corresponding to the preceding steps 1-5.

Specifically, first, the light source generator 11 emits a diffused light beam right to a focal point direction of a collimator 10, the diffused light beam is changed into a parallel light beam through the collimator 10 and enters the beam splitting mirror 12, the parallel light beam, after passing through the beam splitting mirror 12, irradiates a surface of a to-be-detected object 4 on a detection platform 3, the parallel light beam is reflected on the surface of the to-be-detected object, and the reflected light beam is reflected to the objective lens 9. A spatial distribution frequency of the reflected light beam is associated with smoothness of the surface of the to-be-detected object. If a defect existing on the surface causes reduction of surface smoothness, the reflected light beam contains more high-frequency light information. If the smoothness of the surface is very high, the reflected light beam contains only zero-frequency light information.

Then, the reflected light beam is transmitted to an optical high-pass filter by a Fourier transform lens 5 in an objective lens 9, and forms a Fourier transform spatial frequency spectrum of the reflected light beam on the surface of the to-be-detected object 4 at the optical high-pass filter. Next, the optical high-pass filter performs filtering modulation processing on the Fourier transform spatial frequency spectrum, and emphasizes high-frequency spatial light information in the Fourier transform spatial frequency spectrum caused by the defect of the surface of the to-be-detected object 4, suppresses the low-frequency spatial light information in the Fourier transform spatial frequency spectrum caused by a smooth area of the surface of the to-be-detected object 4, and by controlling a position and a band-pass range of the optical high-pass filter, enhances contrast of the high-frequency light information caused by the defect of the smooth surface of the to-be-detected object 4 with respect to the zero-frequency light information.

Secondly, after passing through the optical high-pass filter, the Fourier transform spatial frequency spectrum is incident to the imaging lens 8, and imaged onto a surface of a photoelectric sensor of the camera 7 by an inverse Fourier transform lens 2 at the imaging lens 8, to form a surface shape image of the to-be-detected object 4. Since the high-frequency light information caused by the defect is larger than the zero-frequency light information caused by the smooth surface, an effect of highlighting defect component is achieved on an imaging surface.

Figure 4:
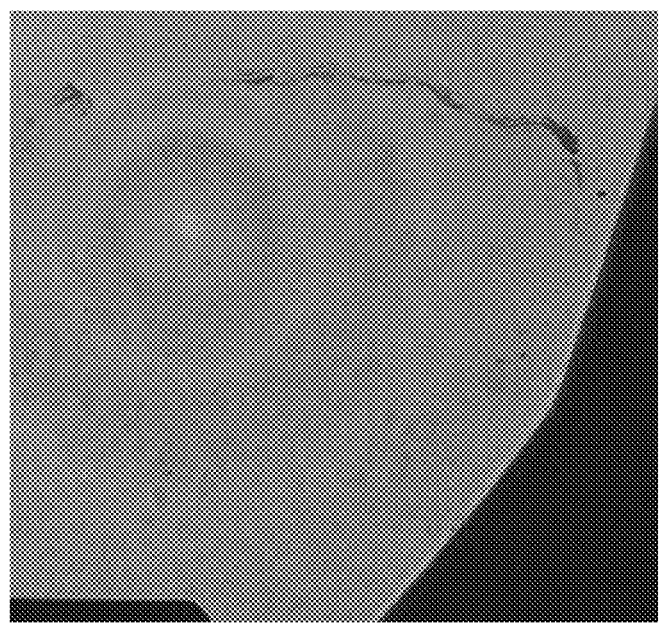
FIG. 4 is a schematic view of a detected surface without using an optical high-pass filter according to an embodiment of the present disclosure.
Figure 5:
FIG. 5 is a schematic view of a detected surface using an optical high-pass filter according to an embodiment of the present disclosure.

Finally, the obtained surface shape image of the to-be-detected object 4 is sent to the image analyzing and processing module 1 for processing, a two-dimensional digital image algorithm is used to further suppress the low-frequency spatial light information, enhance a mutation feature caused by the defect, strengthen contrast and visibility of the defect, and then a high-speed, high-precision defect identification and classification function is realized by artificial intelligence technology and dedicated hardware image processing module on the image analyzing and processing module 1. In a detection process, normal incidence parallel light is adopted. A reason thereof is as follows: when the light beam irradiates the surface of the to-be-detected object 4, if the surface of the to-be-detected object 4 is smooth, the light beam is normally reflected back, and the reflected light beam only contains zero-frequency light information, and if the defect is irradiated, scattered light rays and diffracted light rays are obtained, and the light beam reflected back not only contains zero-frequency light information but also contains high-frequency light information. In this case, in order to highlight a defect image, it is necessary to distinguish the high-frequency light information from the zero-frequency light information, and suppress the zero-frequency light information as much as possible. As shown in FIG. 4 and FIG. 5, image defect situations before and after the optical high-pass filter is used in the detection system are verified by experiments. When the optical high-pass filter is used, low-frequency information caused by the smooth surface of the to-be-detected object 4 is further suppressed, and the defect on the image is more obvious and prominent, and when the optical high-pass filter is not used, the defect on the finally obtained image is not prominently displayed.

It can thus be seen that for a general optical imaging system, it has magnification of 0.5 folds, and a detection range of 14 mm×10 mm, and only can detect defects of 15 microns or more. However, for ultra-micro defects, accuracy of 15 microns or more is far from enough, therefore, the microscopic imaging technology needs to be used. A surface defect of 0.5 microns can be detected by 20-fold microscopic imaging technology, but the detection range decreases dramatically. In the present disclosure, in order to highlight image with micro-defects without narrowing the detection range, the present system uses an optical filtering imaging technology. An imaging effect of a 20-fold optical microscope can be achieved for images with surface defect, equivalent to resolution level of a high-magnification optical microscope, and meanwhile, an observation field of view of 14 mm×10 mm is rendered. In other words, the imaging system of the present disclosure has a relatively large detection range, and meanwhile visualizes micro-defects that generally can be observed only by a high-resolution microscope, can realize the detection of a ultra-micro defect on a high-precision smooth surface, and realizes detection of a defect of 0.5 microns in a range of 14 mm×10 mm, with short detection time, and high detection efficiency.

Embodiment 2 is suitable to surface protruding defects such as convex marks, bumps, and creases.

This embodiment is substantially the same as Embodiment 1, and different in that: parallel light in an inclined direction is used to irradiate the surface of the to-be-detected object in the present embodiment.

Exemplarily, at an optical fiber input port in FIG. 2, an output end of each optical fiber is equivalent to a point light source, and a beam of parallel light is formed after light passes through the collimator. A plurality of input optical fibers are used, output ends thereof are distributed on the same concentric circle, and parallel light of different inclined directions is formed after light passes through the collimator and irradiates the surface of the to-be-detected object.

Figure 6:
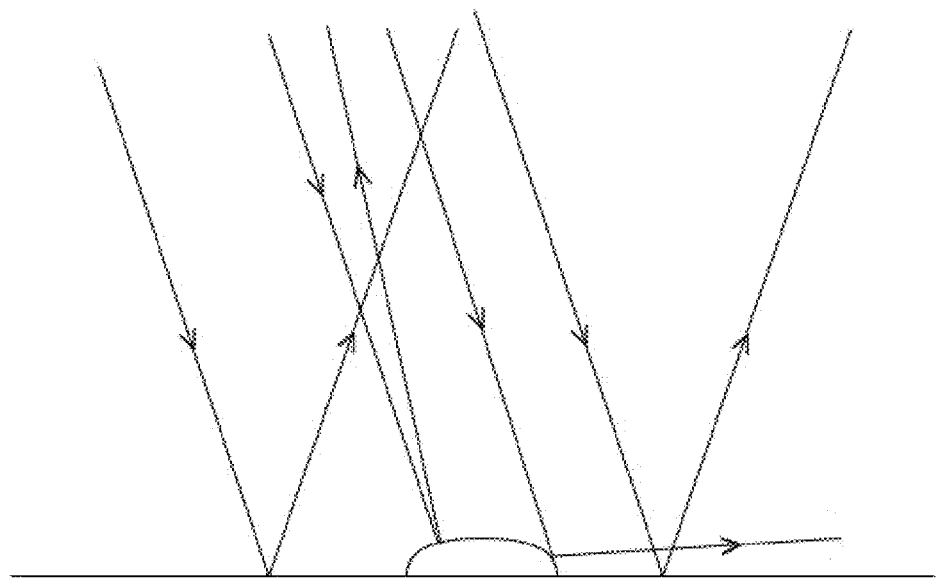
FIG. 6 is a schematic diagram of irradiating light of the same inclined direction onto a surface of a to-be-detected object according to an embodiment of the present disclosure.

As shown in FIG. 6, if the surface of the to-be-detected object is smooth, the reflected light beam only contains a light beam of a single frequency after passing through a Fourier lens. The frequency of this light beam is associated with the direction of the parallel light irradiating the surface of the to-be-detected object, referred to as carrier frequency of incident light beam, and denoted by f0. If there is a minute protrusion on a place of the surface, a reflected light beam thereof, after passing through the Fourier transform lens, forms a multi-frequency light beam centered on the carrier frequency, denoted by f0±Δf. The light beam of the carrier frequency f0 is blocked on a frequency spectrum surface, and an effect of highlighting the defect is achieved by light beams in the periphery of this carrier frequency. Inclined illumination parallel light has the same effect as dark field illumination effect of a general optical imaging system, and is particularly suitable for detecting a protruding defect of a surface. However, this method can acquire a part of information on the protruding defect.

Embodiment 3 is suitable to surface protruding defects such as convex marks, bumps, and creases.

Figure 7:
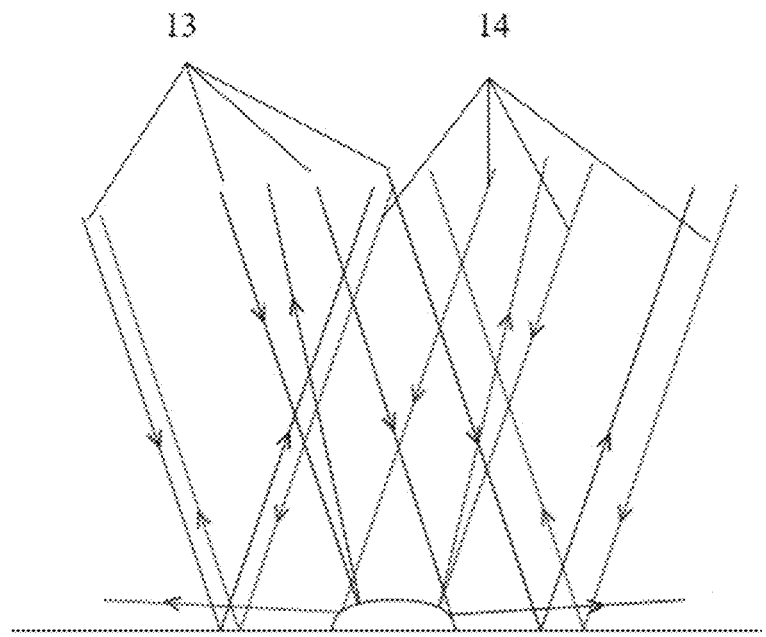
FIG. 7 is a schematic diagram of irradiating light of different inclined directions onto a surface of a to-be-detected object according to an embodiment of the present disclosure.

On the basis of Embodiment 2, the inclined illumination parallel light is increased to be from 4 directions, and slantwise irradiates the surface of the to-be-detected object from four different directions. FIG. 7 only shows a schematic diagram of inclined illumination in two directions (for example, two left and right directions), and inclined illumination light beams in the other two directions (for example, two front and rear directions) are not shown in FIG. 7. Exemplarily, viewing the optical fiber input ends from the direction of the collimator, four optical fibers are distributed at four orientations, and a distance between an output end of each optical fiber and an optical axis (that is, a central position) is the same. After passing through the collimator, inclined illumination in four different directions is formed.

As shown in FIG. 7, by adding parallel light illumination in different directions, a complete picture of the protruding defect can be acquired, further improving Embodiment 2. In the drawing, reference sign 13 denotes incident light and reflected light in one direction, and reference sign 14 denotes incident light and reflected light in another direction. The parallel light beam incident from the left cannot acquire a right image of the protruding defect, and the parallel light beam incident from the right cannot acquire a left image of the protruding defect. By simultaneously adopting parallel light illumination in two left and right directions, two left and right images of the defect can be acquired. By using parallel light illumination in four directions, a complete picture of the protruding defect is obtained. Since the parallel light illumination in four different directions is used, there are four carrier frequencies on a Fourier transform spectrum surface, debited by f0, f1, f2, and f3. Four independent filters need to be provided on the frequency spectrum surface to block light beams corresponding to the four carrier frequencies, and allow light beams of other frequencies generated by the defect in different illumination directions to enter the inverse Fourier transform lens, to form a clear defect image. If the four carrier frequencies have the same magnitude, different from Embodiment 1, the shape of the filter is of an annular structure, and has a distance to the zero frequency being an absolute value of f0. As shown in FIG. 7, the light beams are blocked from passing through an annular region, and in other regions, the light beams are allowed to pass. The inclined illumination enhances the intensity of the protruding defect in the image, and improves the contrast of the defect.

Embodiment 4 Implementation Mode of Spatial Filter

Figure 8:
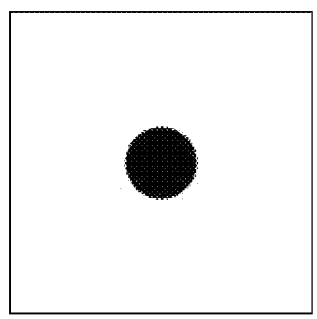
FIG. 8 is a schematic diagram of a filtering shape after forming high-pass filtering on a frequency spectrum surface according to an embodiment of the present disclosure.
Figure 9:
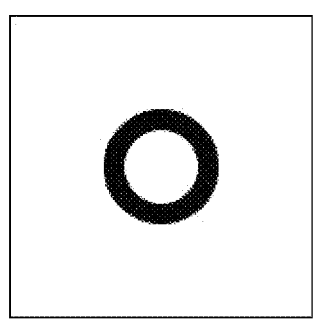
FIG. 9 is a schematic diagram of an annular filtering shape formed on a frequency spectrum surface according to an embodiment of the present disclosure.

In order to improve adaptability of the apparatus, a spatial light modulator is used to realize a spatial filtering function. As shown in FIG. 8 and FIG. 9, by using a liquid crystal spatial light modulator, different filtering shapes can be formed on the frequency spectrum surface, and functions such as high-pass filtering and an annular band-stop filter can be realized. The filter may be a binary filter or a gradient multi-value filter, wherein the gradient multi-value filter has a better technical effect.

The above-mentioned are merely several embodiments of the present disclosure, but do not limit the present disclosure in any form. Although the present disclosure is disclosed in the above with preferred embodiments, they are not used to limit the present disclosure. Without departing from the scope of the technical solutions of the present disclosure, some changes or modifications made with the technical contents disclosed in the above by any skilled person familiar with the art are equivalent to equivalent embodiments, and all belong to the scope of protection of the technical solutions of the present disclosure.

What is claimed is:

1. An ultra-micro defect detection apparatus, comprising an imaging module, a light source module, a filtering module, a mounting platform, and an image analyzing and processing module, wherein
   the imaging module comprises:
      a camera, an imaging lens, and an objective lens, and the camera, the imaging lens, and the objective lens are sequentially and vertically arranged from top to bottom;
   the light source module comprises:
      a collimator, a light source generator, and a beam splitting mirror, the light source generator is connected to the beam splitting mirror, and the collimator is mounted between the light source generator and the beam splitting mirror; and
   the filtering module comprises a spatial filter, and the spatial filter is mounted between the imaging lens and the objective lens, for magnifying a defect of a surface of a to-be-detected object, wherein
   the objective lens is set as a single objective lens along a direction perpendicular to an optical axis, the spatial filter is a liquid crystal spatial light modulator, a position and a band-pass range of the liquid crystal spatial light modulator are movably adjusted and controlled, the image analyzing and processing module obtains multiple high-contrast images of high-frequency light information caused by a defect of a smooth surface of the to-be-detected object relative to light information, and the image analyzing and processing module performs superimposition processing on multiple images based on the multiple images at different imaging positions acquired by the camera, to obtain a surface shape image of the to-be-detected object.

2. The ultra-micro defect detection apparatus according to claim 1, wherein the image analyzing and processing module is connected to the camera, for performing image analysis and processing on an acquired image.

3. The ultra-micro defect detection apparatus according to claim 1, wherein
   the objective lens comprises a Fourier transform lens; and
   the imaging lens comprises:
   an inverse Fourier transform lens.

4. The ultra-micro defect detection apparatus according to claim 1, wherein the beam splitting mirror, the objective lens, the imaging lens, and the camera are all connected to a displacement seat, and are fixed on a surface of the mounting platform by the displacement seat, ranging rods are mounted on one side of the displacement seat, and the beam splitting mirror, the objective lens, the imaging lens, and the camera are movably adjusted on the displacement seat, and are mounted at intervals by measuring distances by respective ranging rods on the displacement seat.

5. The ultra-micro defect detection apparatus according to claim 4, wherein the spatial filter is connected to the displacement seat and is fixed on the surface of the mounting platform by the displacement seat, a ranging rod is mounted on one side of the displacement seat facing the objective lens, the spatial filter is movably adjusted on the displacement seat, and the spatial filter is mounted at intervals with a Fourier transform lens in the objective lens and an inverse Fourier transform lens in the imaging lens.

6. The ultra-micro defect detection apparatus according to claim 1, wherein the light source generator is installed at a focal point of the collimator away from the beam splitting mirror, the light source generator emits a diffused light beam, and the diffused light beam is changed into a parallel light beam through the collimator and enters the beam splitting mirror.

7. The ultra-micro defect detection apparatus according to claim 1, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

8. An ultra-micro defect detection method, comprising following steps:
   step 1, emitting detection light rays, to irradiate a surface of a to-be-detected object;
   step 2, reflecting the detection light rays by the surface of the to-be-detected object to obtain reflected light rays, and performing optical Fourier transformation on the reflected light rays;
   step 3, performing filtering modulation processing on light rays having undergone the optical Fourier transformation, wherein the filtering modulation processing comprises magnifying a defect of the surface of the to-be-detected object by a spatial filter;

step 4, performing inverse Fourier transformation on light rays having undergone the filtering modulation processing, and obtaining a surface shape image of the to-be-detected object by imaging; and step 5, analyzing and processing the acquired surface shape image of the to-be-detected object, wherein an objective lens for the optical Fourier transformation is set as a single objective lens along a direction perpendicular to an optical axis, the spatial filter is a liquid crystal spatial light modulator, a position and a bandpass range of the liquid crystal spatial light modulator are movably adjusted and controlled, multiple high-contrast images of high-frequency light information caused by a defect of a smooth surface of the to-be-detected object relative to light information are obtained, and superimposition processing is performed on multiple images based on the acquired multiple images at different imaging positions, to obtain the surface shape image of the to-be-detected object; wherein:

the step 1 further comprises: emitting, by a light source generator, a diffused light beam right to a focal point direction of a collimator, changing the diffused light beam into a parallel light beam through the collimator to enter a beam splitting mirror, and irradiate the surface of the to-be-detected object on a detection platform;

the steps 2 and 3 further comprise: making the parallel light beam to be reflected on the surface of the to-be-detected object, reflecting reflected light beam to the objective lens, transmitting reflected light beam to the spatial filter by an Fourier transform lens in the objective lens, and forming a Fourier transform spatial frequency spectrum of the reflected light beam on the surface of the to-be-detected object at the spatial filter, and performing the filtering modulation processing on the Fourier transform spatial frequency spectrum by the spatial filter;

the step 4 further comprises: after the Fourier transform spatial frequency spectrum passing through the spatial filter, making the Fourier transform spatial frequency spectrum to be incident to an imaging lens, and imaged to a surface of a photoelectric sensor of a camera by an inverse Fourier transform lens at the imaging lens, to form the surface shape image of the to-be-detected object; and the step 5 further comprises: performing analysis and processing on the acquired surface shape image of the to-be-detected object by an image analyzing and processing module.

9. The ultra-micro defect detection method according to claim 8, wherein the step 4 further comprises:

by changing an imaging position, acquiring multiple images at different imaging positions, and forming the surface shape image of the to-be-detected object based on an image superposition processing algorithm.

10. The ultra-micro defect detection apparatus according to claim 2, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

11. The ultra-micro defect detection apparatus according to claim 3, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

12. The ultra-micro defect detection apparatus according to claim 4, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

13. The ultra-micro defect detection apparatus according to claim 5, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

14. The ultra-micro defect detection apparatus according to claim 6, wherein light irradiated by the light source module onto the to-be-detected object is normal incidence parallel light, parallel light tilted with respect to the surface of the to-be-detected object from the same direction, or parallel light tilted with respect to the surface of the to-be-detected object from different directions.

15. The ultra-micro defect detection method according to claim 8, wherein the step 4 further comprises:

by changing an imaging position, acquiring multiple images at different imaging positions, and forming the surface shape image of the to-be-detected object based on an image superposition processing algorithm.

* * * * *